July 9, 1940.  J. R. MOSER  2,207,518

PIPE JOINT

Filed Oct. 5, 1937

INVENTOR
JESSE R. MOSER
BY
ATTORNEY

Patented July 9, 1940

2,207,518

UNITED STATES PATENT OFFICE 2,207,518

PIPE JOINT

Jesse R. Moser, Detroit, Mich., assignor to Vickers Incorporated, Detroit, Mich., a corporation of Michigan Application October 5, 1937, Serial No. 167,404

3 Claims. (Cl. 285—131)

This invention relates to power transmissions and more particularly to those of the type comprising one or more fluid pressure energy translating devices, one of which may function as a pump and another as a fluid motor. Transmissions of this character frequently involve complex hydraulic circuits requiring the use of many separable piping connections between the various fluid pressure energy translating devices and control valves, etc. The fluid pressures which are generated in such conduits are frequently rather high, many systems in use today operating at pressures upwards of one thousand pounds per square inch. In many systems of this character any given conduit may be subjected to varying pressures and may even at times be under a negative pressure or vacuum while at other times the same conduit may be subjected to very high pressures.

Various kinds of separable pipe connections are used in this art, the most common type being that which comprises two flanges one on each conduit portion to be joined and a ring or gasket of copper or other soft metal which is subjected to a high degree of compression by the bolts or other fastening means which hold the two flanges together. Pipe connections of this character require very large forces to be applied to the gaskets initially inasmuch as the compressive force exerted by the bolts is decreased as the internal fluid pressure increases due to the axial separating force exerted by the fluid within the conduits. It results then that the flanges and bolts necessary for couplings of this character become extremely bulky and heavy where high fluid pressures are to be successfully confined.

It is an object of the present invention to provide a separable pipe coupling wherein the internal fluid pressure forces are utilized to tighten the seal in proportion to the increase in fluid pressure.

It is also an object to provide a separable pipe connection of the character described which also provides an effective seal when the pressure within the conduit is lower than the pressure outside the conduit, as when the fluid in the conduit is under a vacuum.

It is a further object to provide a separable pipe connection wherein the above results may be achieved even though the two pipe sections to be joined are not in exact axial alignment when assembled or when subjected to expansion contraction, or other strains causing temporary misalignment.

Further objects and advantages of the present invention will be apparent from the following description, reference being had to the accompanying drawing wherein a preferred form of the present invention is clearly shown.

Figure 1:
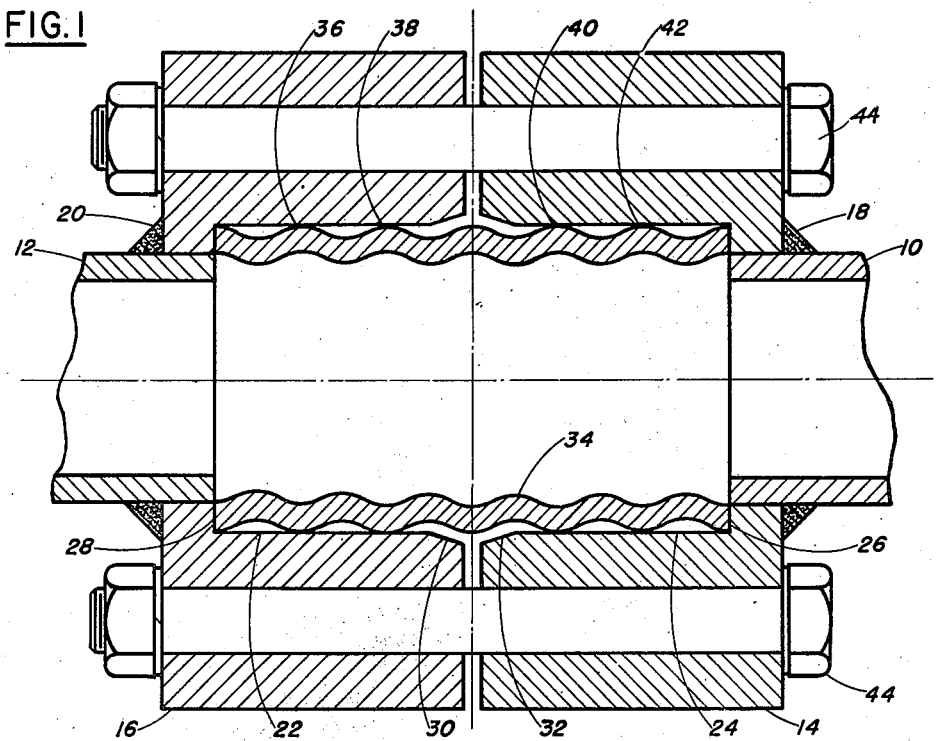
Fig. 1 is a longitudinal cross section of a pipe connection embodying a preferred form of the present invention.

Referring now to Fig. 1, 10 and 12 represent two portions of a conduit which are to be joined by a separable connection. For this purpose flanges 14 and 16 are secured to the conduit portions 10 and 12 by welding at 18 and 20. The flanges are provided with open-ended recesses 22 and 24 having end shoulders at 26 and 28 and provided with smoothly finished internal cylindrical walls. The entrance openings to the recesses 22 and 24 are preferably outwardly tapered as at 30 and 32. Within the recesses 22 and 24 there is mounted a sleeve member 34 of corrugated form, as illustrated, and so arranged as to contact the walls of the recesses 22 and 24 at a plurality of spaced points 36, 38, 40 and 42. Preferably, but not necessarily, the engagement at these points is a slight press-fit of the order of .0015 inch for sleeves up to 3 inches in diameter and .0025 inch for sleeves of greater diameters. The corrugations in the sleeve 34 are preferably formed so that the outer surface of the sleeve at the circle of contact and immediately adjacent thereto is frustro-spherical to provide for slight misalignment between the median plane of a given corrugation and a plane perpendicular to the axis of the recess. The sleeve 34 has a free length slightly in excess of the combined depth of the recesses 22 and 24. Through-bolts 44 are provided for holding the flanges 14 and 16 together.

In operation, the sleeve 34 is entered between the flanges 14 and 16 in the tapered portions 30 and 32 and long assembling bolts not shown are inserted and drawn up to force the sleeve 34 into the recess and against the shoulders 26 and 28. The bolts 44 are then inserted in place of the assembly bolts and drawn up to compress the sleeve axially a considerable amount. Due to the corrugated form of the sleeve 34 this axial compression creates a tendency for the sleeve to expand at the contact points 36, 38, 40 and 42, increasing the contact pressure at these points. The contact pressure which is initially applied when the joint is assembled is sufficient to provide a fluid-tight seal even though the pressure within the conduit is lower than the pressure outside. In addition, there are a plurality of seals in series which further assist in insuring a fluid-tight joint. This is particularly advantageous in instances where the sleeve may be subjected to rough handling. Thus, even though one of the sealing surfaces becomes scratched or otherwise damaged, the chance of all of the sealing surfaces becoming damaged is much more remote than if but a single sealing surface were provided in each sleeve. Even though all but one of the sealing surfaces are damaged, a single sealing surface is sufficient to form a fluid-tight seal. When the fluid within the conduit is subjected to internal pressure above the pressure outside the conduit, the sleeve tends to further expand and actually does expand in those portions intermediate the contact surfaces 36, 38, 40 and 42. This expansion further increases the contact pressure in proportion to increases in pressure within the conduit. In order to obtain the maximum benefit from this expansive effect caused by fluid pressure it is necessary that the walls of the sleeve 34 be more flexible than the walls of the recesses 22 and 24. Preferably the material of the sleeve 34 is also softer than that of the walls of the recesses.

Figure 2:
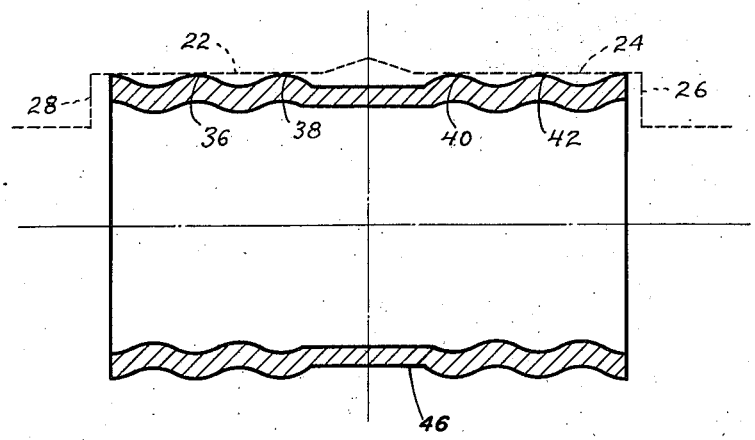
Fig. 2 is a longitudinal section of a sleeve forming part of a pipe connection representing a modified form of the present invention.

Referring now to Fig. 2 there is illustrated a modified form of the invention wherein a sleeve 46 is provided for assembly in the same flanges illustrated in Fig. 1. The sleeve 46 differs from the sleeve 34 in that the mid-section thereof is made cylindrical rather than corrugated inasmuch as the center corrugation serves no particular purpose in the sleeve 34. The sleeve 46 is also somewhat shorter than the sleeve 34 so that the effect of endwise compression and its resulting radial expansion of the sleeve is not produced in this form of the invention. It is therefore important that the sleeve 46 fit in the recesses with a slight press-fit.

The operation of this form of the invention may be readily understood from the previous description, the essential difference being that the sleeve 46 is subjected to expansion only by the internal fluid pressure. A joint of this character is thus suitable in instances where the internal fluid pressure is never lower than the pressure outside the conduit.

It will be understood that the invention is not confined to the joining of two portions of a single conduit but may be embodied also in pipe connections where a plurality of conduits are joined by a single pair of flanges.

While the form of embodiment of the invention as herein disclosed, constitutes a preferred form, it is to be understood that other forms might be adopted, all coming within the scope of the claims which follow.

What is claimed is as follows:

1. In a separable pipe joint the combination of two conduit portions to be connected, each provided with an open-ended cylindrical recess, a metallic sleeve circumferentially engaging the walls of said recess over limited areas at a plurality of axially spaced circles of contact and spaced from the recess walls between said circles, said sleeve having walls of sufficient flexibility to expand under internal pressure and cause tighter engagement with the recess walls, and means for compressing said sleeve endwise to cause radial expansion thereof whereby the sleeve more tightly engages the walls of the recess irrespective of internal fluid pressure.

2. In a separable pipe joint the combination of two conduit portions to be connected, each provided with an open-ended cylindrical recess, a metallic sleeve externally engaging the internal walls of each recess over limited areas at a plurality of axially spaced circles of contact and spaced from the recess walls between said circles, and means for compressing said sleeve endwise to cause radial expansion thereof whereby the sleeve more tightly engages the walls of the recess irrespective of internal fluid pressure.

3. In a separable pipe joint the combination of two conduit portions to be connected, each provided with an open-ended cylindrical recess, a metallic sleeve externally engageable with the internal walls of each of said recesses at a plurality of axially spaced circles of contact in each recess and formed to expand radially when subjected to straight axial compression, and means for retaining said conduit portions together with the sleeve mounted therebetween with sufficient axial force to expand the sleeve radially into fluid-tight engagement with the walls of the recess.

JESSE R. MOSER.